(12) United States Patent
Jack et al.

(10) Patent No.: US 10,369,668 B2
(45) Date of Patent: Aug. 6, 2019

(54) WELDING SYSTEM

(71) Applicant: LINCOLN GLOBAL, INC., City of Industry, CA (US)

(72) Inventors: Christopher Jack, San Diego, CA (US); Stephen Cole, Chula Vista, CA (US)

(73) Assignee: LINCOLN GLOBAL, INC., City of Industry, CA (US)

(*) Notice: Subject to any disclaimer, the term of this patent is extended or adjusted under 35 U.S.C. 154(b) by 472 days.

(21) Appl. No.: 15/180,597

(22) Filed: Jun. 13, 2016

(65) Prior Publication Data

US 2017/0001268 A1 Jan. 5, 2017

Related U.S. Application Data

(60) Provisional application No. 62/188,441, filed on Jul. 2, 2015.

(51) Int. Cl.
| | | |
|---|---|---|
| *B23K 37/02* | (2006.01) | |
| *B23K 9/028* | (2006.01) | |
| *B23K 26/282* | (2014.01) | |
| *B23K 37/053* | (2006.01) | |
| *B23K 9/00* | (2006.01) | |
| *B23K 9/16* | (2006.01) | |
| *B23K 10/00* | (2006.01) | |
| *B23K 26/38* | (2014.01) | |
| *B23K 101/04* | (2006.01) | |
| *B26F 3/00* | (2006.01) | |
| *B23K 101/06* | (2006.01) | |
| *B23K 101/10* | (2006.01) | |

(52) U.S. Cl.
CPC ........ *B23K 37/0229* (2013.01); *B23K 9/0026* (2013.01); *B23K 9/0282* (2013.01); *B23K 9/16* (2013.01); *B23K 10/00* (2013.01); *B23K 26/282* (2015.10); *B23K 26/38* (2013.01); *B23K 37/0276* (2013.01); *B23K 37/0538* (2013.01); *B23K 2101/04* (2018.08); *B23K 2101/06* (2018.08); *B23K 2101/10* (2018.08); *B26F 3/004* (2013.01)

(58) Field of Classification Search
CPC ............... B23K 9/0282; B23K 26/282; B23K 37/0538; B23K 37/0276; B23K 37/0229; B23K 9/0026; B23K 10/02; B23K 26/0823
See application file for complete search history.

(56) References Cited

U.S. PATENT DOCUMENTS

| | | | | |
|---|---|---|---|---|
| 3,555,239 A | * | 1/1971 | Kerth .................... | B23K 9/0286 219/121.63 |
| 4,179,602 A | * | 12/1979 | Maruyama ............. | B23K 9/127 219/125.1 |
| 4,364,171 A | * | 12/1982 | Niemann ............... | B23K 7/006 219/60 A |

(Continued)

*Primary Examiner* — Geoffrey S Evans
(74) *Attorney, Agent, or Firm* — Foley & Lardner LLP (57) ABSTRACT

A welding system is disclosed that includes a power supply, a controller in communication with the power supply, and a welder in communication with the controller. The controller detects a configuration of the welder that includes at least a 1G configuration. Upon the controller detecting the 1G configuration, the controller inverts a height adjustment and automatically calculates a contact tip to work distance.

19 Claims, 7 Drawing Sheets

(56) References Cited

U.S. PATENT DOCUMENTS

| | | | | |
|---|---|---|---|---|
| 4,883,938 A | * | 11/1989 | Sarugaku | B23K 9/12 219/124.34 |
| 2004/0056066 A1 | * | 3/2004 | Marhofer | B23K 9/0216 228/8 |
| 2005/0224480 A1 | * | 10/2005 | Lipnevicius | B23K 9/0216 219/125.11 |
| 2015/0108096 A1 | * | 4/2015 | Daniel | B23K 9/044 219/76.12 |
| 2016/0339533 A1 | * | 11/2016 | Oxlade | B23K 9/0953 |

* cited by examiner

WELDING SYSTEM

CROSS-REFERENCE TO RELATED PATENT APPLICATIONS

This application claims priority under 35 U.S.C. § 119 to U.S. Provisional Patent Application No. 62/188,441, filed Jul. 2, 2015, which is incorporated herein by reference in its entirety.

TECHNICAL FIELD

In general, the present application relates to a welding system that is adapted to weld in an orbital configuration or a fixed configuration. More particularly, a welding system is disclosed that includes a controller that detects the configuration of the welding system, calibrates operation of the welder in the welding system based on the configuration, and coordinates motion of the welder or workpiece based on the configuration of the welder.

BACKGROUND

Welding systems reside at the core of the modern industrial age. From massive automobile assembly operations to automated manufacturing environments, these systems facilitate joining in ever more complicated manufacturing operations. Hot wire welding processes a wire or electrode being heated (e.g., via current) and received by a puddle created by a main heat source (e.g., plasma arc, tungsten inert gas (TIG) welding, metal inert gas (MIG) welding, flux core, among others). The hot wire welding process includes the resistance heating of the wire up to or near a melting point of such wire. In hot wire welding processes, the formation of an arc is avoided since an arc condition disrupts or overheats the puddle. A wire heated near or close to the melting point of the wire without arcing events is received by the puddle with little or no disruption. In order to prevent a formation of an arc, a welding parameter related to the workpiece can be detected. The welding parameter can indicate an arc condition in which the hot wire welding process can be adjusted.

Additionally, welding may involve raising, cladding, building up, filling, hard facing, overlaying, joining, and other welding applications. When confronted with a workpiece having a curved surface, an orbital welding process may be used to rotate the welding head to apply a weld to the curved surface. The most common example, where orbital welding is used, is the welding of pipe. Pipe welding may include thin wall application where the welding head is rotated about the other surface two piece ends being joined together. Alternatively, pipe welding may include deep groove geometries where the welding electrode extends into a grove formed between the two pipes being joined to lay down successive beads of weld material to fill the groove and join the thick walled pipes. Orbital welding systems may include a welding head that is mounted on a guide track or a fixture that clamps or is otherwise supported on the workpiece and rotated to supply a weld. Orbital welding often involves limited visibility of a welding zone with lead cameras and/or trailing cameras.

Welding systems can include numerous controls that can be adjusted by a user during a welding operation. For instance, conventional welding systems can include up to sixteen (16) buttons, inputs, and switches that require years of experience to comprehend and use efficiently. Often, a change in one adjustment can lead to a change in another adjustment in order to maintain consistency.

Orbital welding systems implement a mobile welder that travels along a track while performing the welding operation. For example, in a pipe welding application, a track is mounted about the adjacent pipe sections and the orbital welder travels on the track in orbit around the pipe sections.

SUMMARY OF THE INVENTION

In accordance with an embodiment, a welding system includes a welder that may be configured to perform orbital welding operations where the welder moves on a track and fixed welding operations where the workpiece is moved relative to the welder. According to another embodiment, the welder is inverted to achieve a 1G configuration relative to the workpiece.

According to a further embodiment, the welding system includes a power supply, a controller in communication with the power supply, and a welder in communication with the controller. The controller detects a configuration of the welder, and the configuration of the welder includes at least a 1G configuration. Upon the controller detecting the 1G configuration, the controller inverts a height adjustment and automatically calculates a contact tip to work distance.

According to a further embodiment, the welding system includes a positioner connected to the controller, where the controller upon detecting the 1G configuration converts a travel position of the welder into a motion of the positioner. According to still a further embodiment, the positioner includes a chuck mounted on a drive shaft of a motor, and the motion of the positioner set by the controller is a revolutions per minute value. According to yet another embodiment, the controller coordinates movement of the positioner with operation of the welder in the 1G position.

According to a further embodiment, the welding system includes a user interface connected to the controller, and the user interface includes a display conveying at least the configuration of the welder. According to still a further embodiment, the user interface includes a user input. In yet another embodiment, the user input allows the user to set welder parameters including at least one of a travel speed and a workpiece diameter.

According to another embodiment, a welding system for welding a workpiece includes a power supply, a controller in communication with the power supply, and a positioner assembly in communication with the controller. The positioner assembly includes at least a first positioner, the first positioner including a chuck mounted on a drive shaft and driven by a drive motor to rotate the chuck. The welding system also includes a welder in communication with the controller and a support that holds the welder in an inverted configuration. The controller detects the inverted configuration of the welder, and, upon the controller detecting the inverted configuration, the controller inverts a height adjustment and automatically calculates a contact tip to work distance.

These and other objects of various embodiments will be evident when viewed in light of the drawings, detailed description and appended claims.

BRIEF DESCRIPTION OF THE DRAWINGS

Embodiments may take physical form in certain parts and arrangements of parts, a preferred embodiment of which will be described in detail in the specification and illustrated in the accompanying drawings which form a part hereof, and wherein.

DETAILED DESCRIPTION

Embodiments relate to a welding system that adapts a welder used in orbital welding for use in a fixed inverted position, also referred to as a 1G position or 1G welding. Most dedicated 1G equipment is a combination of multiple numbers of companies that come together or are integrated into a single solution for a customer. They are limited in creating a unique and simplified solution for the operator. Most are adaptations of robotic solutions driven by PLCs or industrial PCs.

The systems also can only be utilized for the exact created purpose and are not flexible as the working environment changes over time.

The welding system shown in the embodiment depicted in FIGS. 1-4 includes a standard orbital welding system that is adapted to operate as a 1G solution. The depicted welding system can still be used for its original intent, i.e. in an orbital welding application providing greater flexibility and enhancing the user experience.

Figure 1:
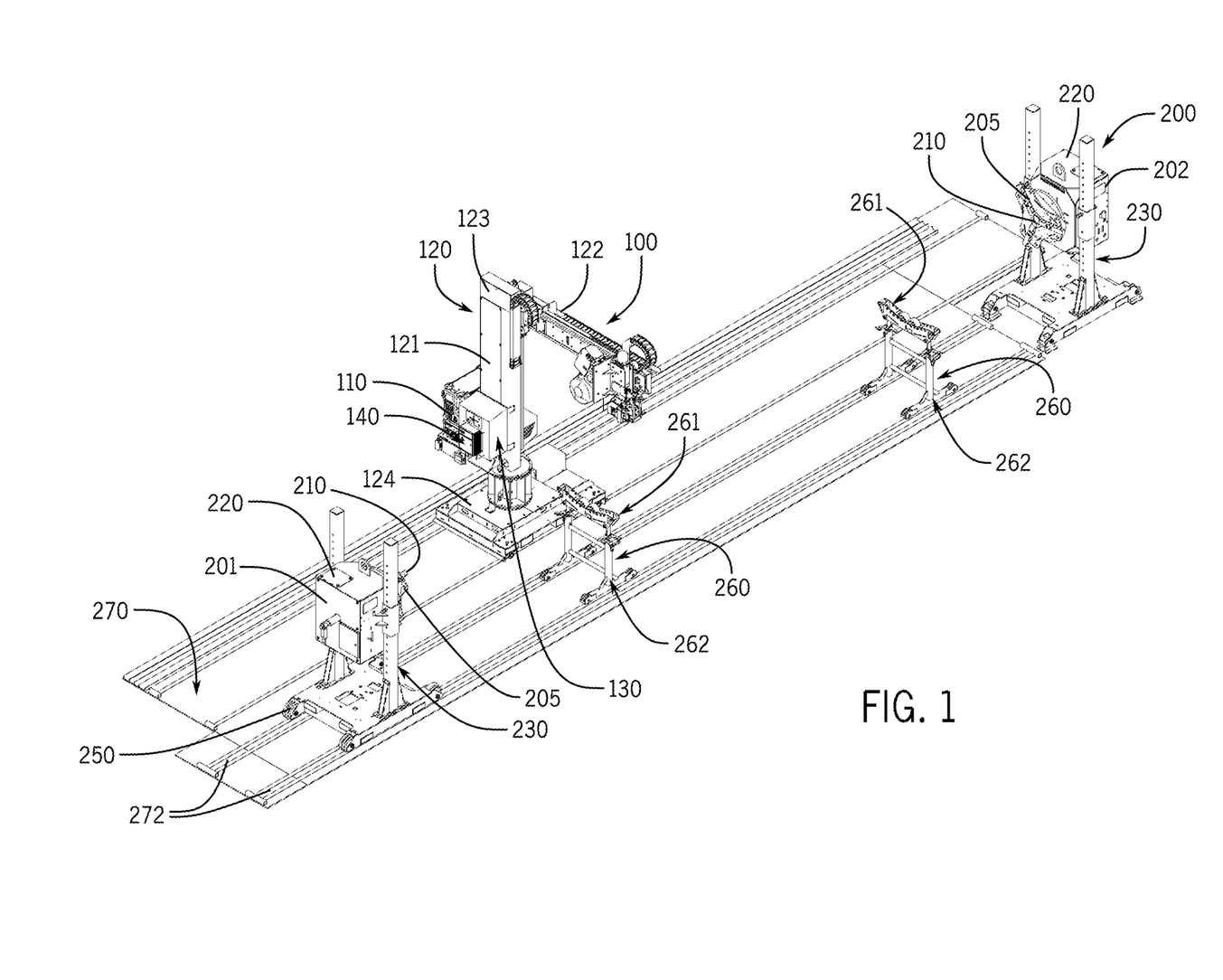
FIG. 1 is a perspective view of a welding system, according to an embodiment.
Figure 4:
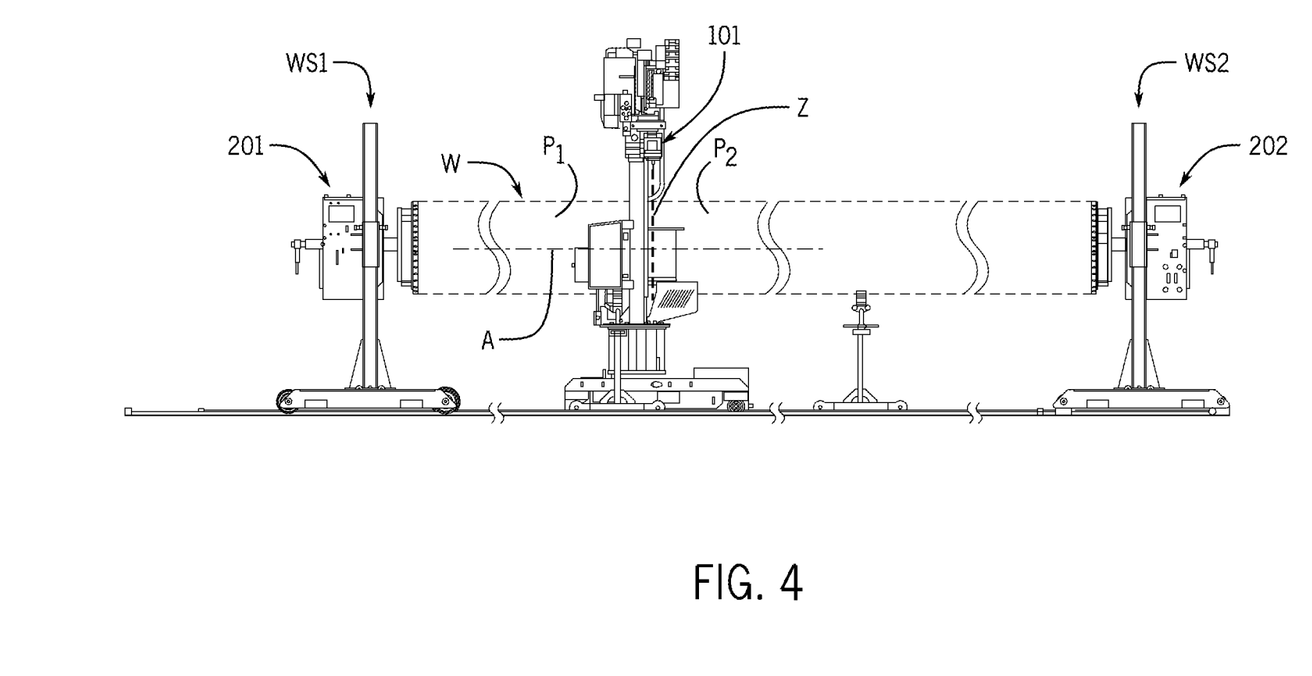
FIG. 4 is a side view of a welding system according to an embodiment.

With reference to FIG. 1, one example of a welding system 100 is shown. Welding system 100 includes a welder 101 that is supported in a desired orientation relative to a workpiece (FIG. 4). Welder 101 may be supported on any suitable support 120 including a framework, beam, suspension system, or gantry. Support 120 may optionally support other components of welding system 100 including but not limited to a power supply 110, controller 130, and user interface 140. As shown, the components may be located adjacent to each other on support 120 or remotely from each other. For example, in the depicted embodiment, support 120 includes an inverted L-shaped member with a first leg 121 extending upward from a floor or base 124 and a second leg 122 extending outward from the upper end 123 of first leg 121.

Figure 2:
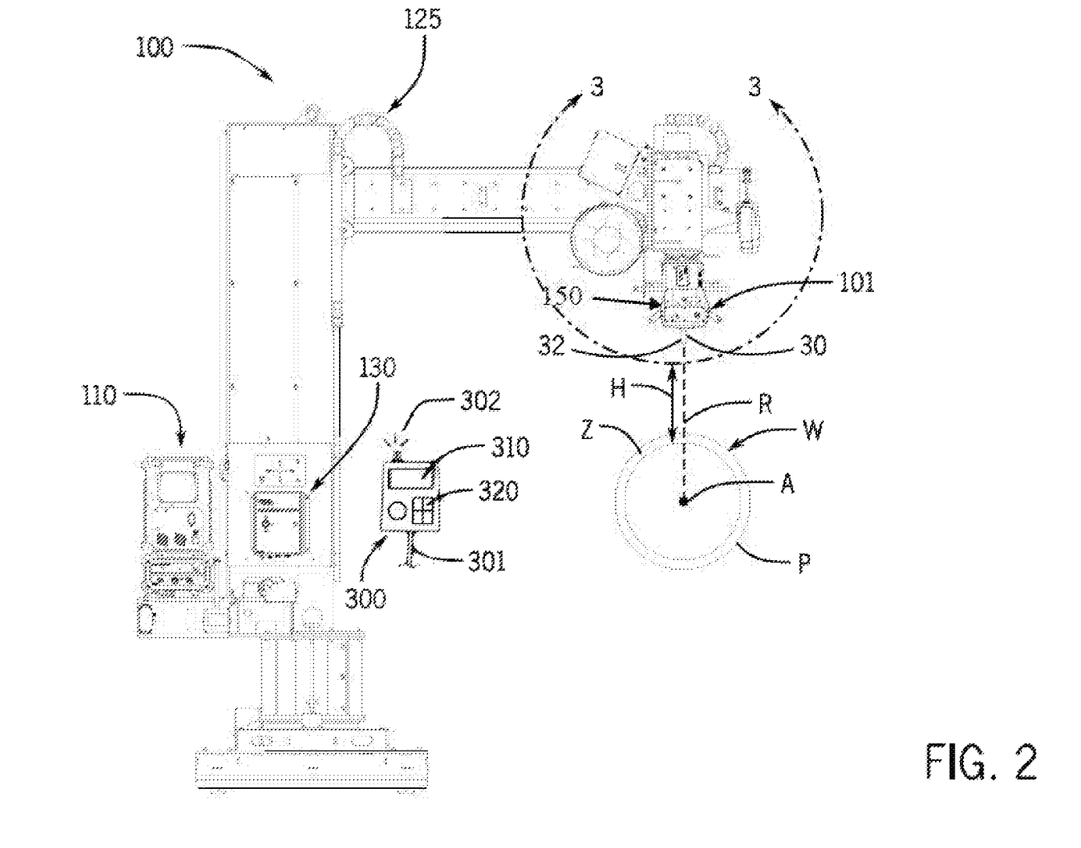
FIG. 2 is a front view of a welding system according to an embodiment.
Figure 3:
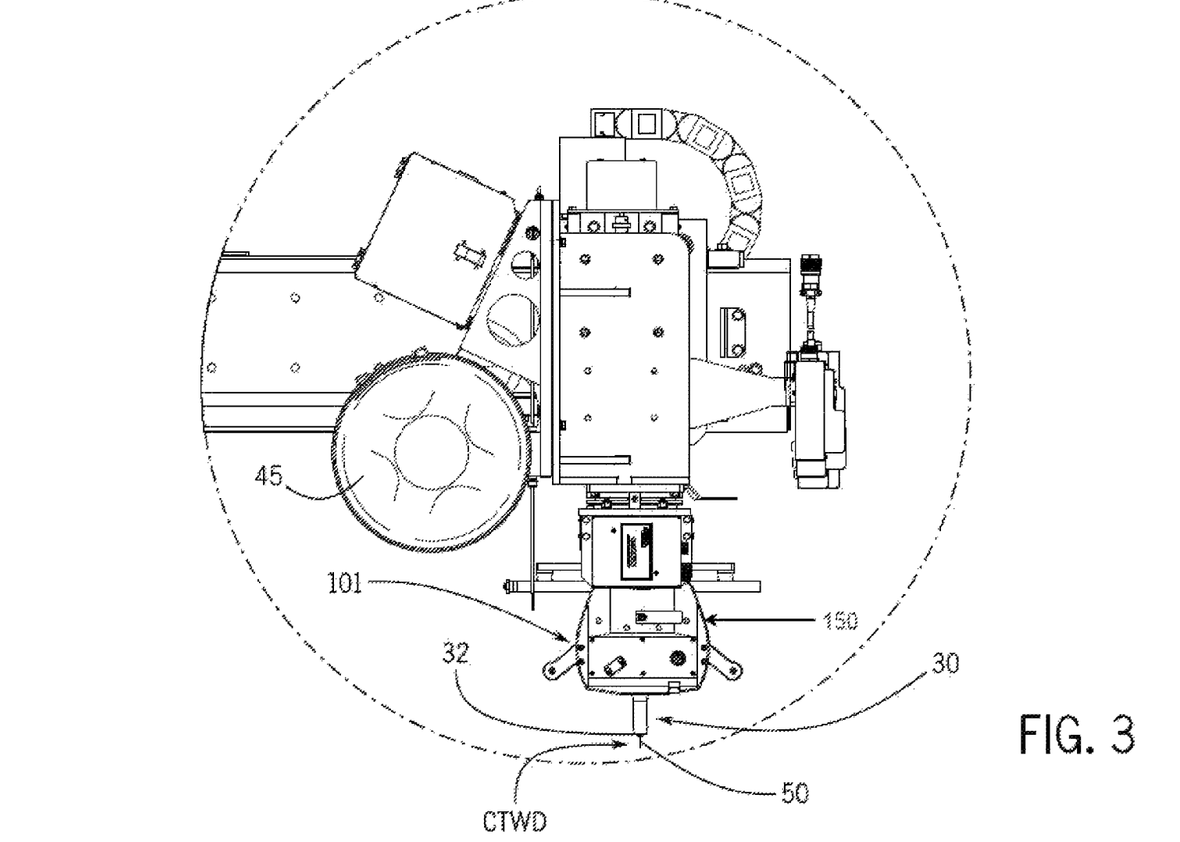
FIG. 3 is an enlarged front view of the area indicated in FIG. 2.

As shown in FIGS. 2 and 3, welder 101 is provided on support 120 in an inverted configuration and held in a generally fixed position by support 120. It will be understood that the orientation could be a non-inverted position, i.e., under the workpiece. According to the embodiment, in this configuration, the system becomes a trackless system and the welder 101 is operated as in a non-orbital mode where it remains fixed and the workpiece W is moved relative to the weld torch 30 to perform the welding operation over the joint or other weld zone Z (FIG. 4). As shown schematically in FIG. 4, weld zone Z is a seam between adjacent pipe sections P1 and P2. It will be understood that the weld zone may vary depending on the type of workpiece or the sections being joined. As discussed more completely below, a positioner assembly, generally indicated by the number 200, may be provided to move the workpiece relative to the welder 101. In the example shown, positioner 200 rotates the pipe sections to allow the weld material to be deposited along the seam between adjacent sections. Overall, in the embodiment shown, welder 101 is held in a fixed inverted (1G) position. Inversion of the welder 101 improves clearance between the weld and the welder 101 facilitating the welding operation. In addition, by holding the welder 101 in a fixed position rather than orbiting around the workpiece, the changing in the proportion of gravity and other parameters implicated in a moving welder are removed or held constant at the fixed position. This provides a more streamlined and consistent weld process.

Optionally, welding system 100 may include one or more positioner assemblies 200 in FIG. 1. Positioner assembly 200 includes any positioner that causes desired movement of the workpiece relative to welder 101. In the example shown, welder 101 is used to weld sections of pipe. The workpiece W thus includes hollow pipe sections. Positioner assembly 200 includes a chuck 205 that attaches to workpiece W. Chuck 205 is mounted on a drive shaft 210 that is driven by a drive motor 220. As shown, positioner assembly 200 may be supported on a stand 230 that allows the height of the chuck to be adjusted. Stand 230 may further be provided with rollers 250, casters, wheels or the like to allow it to be moved easily and further adjust its position relative to the workpiece W. As needed, positioner assembly 200 may also include at least one workpiece support 260 to provide support to workpiece W. In the example shown, workpiece support 260 includes a cradle 261 supported on a stand portion 262. The stand portion 262 may provide a height adjustment similar to stand 230 allowing the cradle 261 to be positioned in supporting contact with workpiece W. Cradle 261 may include rolling element 265 that are oriented to travel at least in the direction of rotation of the workpiece W. As a further option, the stand portions 262 may include rollers, wheels or the like to facilitate their positioning along the length of workpiece W. Depending on the level of automation desired, a track assembly, generally indicated at 270, may be provided to locate the welding system support 120, positioner assembly 200 and workpiece supports 260 relative to each other and define tracks 272 that limit the motion of the components along a defined path. The track assembly 270 may form a floor that is placed in a building or other enclosure or alternatively mounted on a mobile platform such as a rail car or truck bed.

With reference to FIG. 2, as discussed, a welder 101 is supported in a 1G position on support 120. Support 120 may provide global height adjustment relative to workpiece W by allowing second leg 122 to move relative to first leg 121. For example, linear movement of second leg 122 on first leg 121 may be accomplished through a slide table or other similar linear motion assembly, generally indicated at 125. In this way, welder 101 may be positioned at a global height appropriate for the workpiece W before beginning the welding operation. For deep groove welding operations this height may be adjusted after each weld pass (i.e. one revolution) or height adjustment could occur at welder 101 as described more completely below.

The standard orbital welder 101 shown in the depicted embodiment includes a height adjustment component that may be on-board the welder or provided in a separate motion controller. In particular, a parameter can be updated based upon, for instance, a user input, and the arc current or the height of the torch can be calibrated to perform the welding operation. Specifically, while a parameter is being adjusted or transitioned to the setting received via user input, the height of the torch and/or the arc current level is maintained until the setting is achieved for the parameter. Once the parameter is at the setting, a second arc current level or second height for the torch is implemented to perform the welding operation. By maintaining the current level and height until the transition is completed, a recalibration allows the welding operation to be within desired tolerances without manual adjustment of multiple parameters. Further, the recalibration can utilize a transition phase that gradually changes the arc current to the second arc current and/or the height to the second height. In the example of adjusting the arc current and/or the height, the welding operation can be a MIG or TIG welding operation. The depicted example implements a MIG welding operation performed for example by the M85 welder provided by Lincoln Electric®.

In another embodiment, a parameter can be updated based upon, for instance, a user input, and the voltage level or the height of the torch can be calibrated to perform the welding operation. Specifically, while a parameter is being adjusted or transitioned to the setting received via user input, the height of the torch and/or the voltage is maintained until the setting is achieved for the parameter. Once the parameter is at the setting, a second voltage level or second height for the torch is implemented to perform the welding operation. By maintaining the voltage level and height until the transition is completed, a recalibration allows the welding operation to be within desired tolerances without manual adjustment of multiple parameters. Further, the recalibration can utilize a transition phase that gradually changes the voltage level to the second voltage level and/or the height to the second height. In the example of adjusting the voltage level and/or the height, the welding operation can be a TIG welding operation. For example, this operation may be implemented by a T45 welder provided by Lincoln Electric®.

In another embodiment, a parameter can be updated based upon, for instance, a user input, and the wire feed speed or the height of the torch can be calibrated to perform the welding operation. Specifically, while a parameter is being adjusted or transitioned to the setting received via user input, the height of the torch and/or the wire feed speed is maintained until the setting is achieved for the parameter. Once the parameter is at the setting, a second wire feed speed or second height for the torch is implemented to perform the welding operation. By maintaining the wire feed speed and height until the transition is completed, a recalibration allows the welding operation to be within desired tolerances without manual adjustment of multiple parameters. Further, the recalibration can utilize a transition phase that gradually changes the wire feed speed to the second wire feed speed and/or the height to the second height. In the example of adjusting the wire feed speed and/or the height, the welding operation can be a sub-arc welding operation.

"Welding" or "weld" as used herein including any other formatives of these words will refer to depositing of molten material through the operation of an electric arc including but not limited to submerged arc, GTAW, GMAW, MAG, MIG, TIG welding, or any electric arc used with a welding system.

Referring now to the drawings, wherein the showings are for the purpose of illustrating an exemplary embodiment of the invention only and not for the purpose of limiting same, FIGS. 1-4 illustrate a welding system that is used with an automated or semi-automated welding system. One illustrative example of a welding system is orbital welding, which is often used for the joining of tubes or pipes of various types of materials. A welding system (also referred to as welder, system, welding system, and/or welder system) is generally indicated by the number 100 in the drawings. As discussed, welding system 100 may be configured for an orbital welding environment, and include a welder 101, which may sometimes be referred to as a welding tractor, that travels on a track system. In an orbital mode or configuration, the welder 101 is mobile and includes a drive mechanism that engages a portion of the track or other adjacent surface to move the welder 101 along the track. Welder 101 may also include a clamping system that engages the track and holds the welder on the track as it travels. In a tube or pipe welding application where the welder 101 literally orbits around the workpiece, the track clamping system supports the welder 101 against the force of gravity when it is in an inverted or partially inverted condition.

According to an embodiment, a standard orbital welder, such as an M85 or T45 welder from Lincoln Electric® is adapted for use in a fixed inverted orientation referred to herein as a 1G orientation. In this orientation, the welder 101 is inverted with the torch 30 extending downward perpendicular to the workpiece W.

In the example shown, the workpiece is a pair of pipe sections P1, P2. In this instance, due the round shape of the sections, torch 30 is perpendicular to an apex of the pipe or located on a radial line R extending upward from the common axis A of the pipe sections P1, P2. In this position, the workpiece W is moved relative to the welder 101 to perform the welding operation. For example, in the depicted embodiment, the pipe sections P1, P2 are rotated to form a seam weld between the adjacent pipe sections. It will be understood that other workpiece movements such as translation can also be used with the welder 101 in the 1G orientation.

Welding system 100 includes a welding torch, generally indicated at 30, having a welding electrode 32 for depositing weld material to form a weld joint at welding zone Z. The length of electrode 32 may vary as needed depending on the particular welding application. For example, longer electrodes may be required when welding in a deep groove or similar application. Welding torch 30 is connected to a shield gas supply 102 that provides an inert gas, such as Argon gas, to welding torch 30. Welding gas supply 102 may include a container, such as a cylinder, that stores shield gas under pressure. Delivery of shield gas, via appropriate tubing or other conduits, may be controlled by a regulator or other controller. A non-pressurized source may be used also with gas delivery provided by a pump or the like. The welder may include a wire feeder, generally indicated at 40, connected to a supply of welding wire, such as a spool 45 that provides wire 50 to welding torch 30. In a TIG operation, wire may be supplied to one or more wire guides adjacent to the electrode.

Welding system 100 includes at least one power supply 110 that is electrically connected to welding torch 30 to provide electrical power to create an arc between the welding torch 30 and workpiece W and deposits weld material on the workpiece W.

Welding system 100 adjusts at least one of a height of torch or an arc current level for a welding operation performed with torch. The height H is a distance between electrode 32 and workpiece W, wherein height H can be referred to as contact tip to work distance, torch head space, stick out, and the like depending on the welding operation. In particular, height H can be adjusted by at least changing a position of torch 30 relative to workpiece W, changing a position of workpiece W relative to torch 30, or a combination thereof.

System 100 can include a controller 130 that is configured to control at least one parameter related to a welding operation performed on workpiece W.

According to an embodiment, controller 130 may perform automatic height adjustment during operation of welder 101. An automatic height adjustment is described more completely below. According to an embodiment, when the welder 101 is placed in a 1G orientation and fixed in this orientation as shown in FIGS. 1-4, the weld head height is inverted at the controller 130. Inversion of the weld head height allows the automatic height adjustment to work normally without requiring the operator to adjust any settings. In this way, manual height control is also inverted with all adjustments being considered up in the perspective of the operator. Auto calibration of the system is also inverted to ensure that when a maximum height search routine is operating, it will not drive the electrode downward into the weld. Instead, the auto calibration drives the torch up in a space away from the weld.

Based on a change of a welding parameter from one value to another value, controller 130 can manage at least one of height H of torch 30 or an arc current level for the welding operation. For the 1G position, the height control and automatic current controlled height response is inverted. This auto-height functionality provides the proper stick out distance also known as control tip to work distance CTWD.

For example, automatic current controlled height response can be adjusted via a change of height H of torch 30. For instance, an increase in height H (e.g., movement of torch 30 away from workpiece W) can decrease the arc current level and a decrease in height H (e.g., movement of torch 30 toward workpiece W) can increase the arc current level. As discussed above, the movement can be provided by moving torch 30, moving workpiece W, or a combination thereof. In the example shown, the workpiece height is constant and torch height is varied. It will be understood that controller 130 can also change voltage, contact tip to work distance or adapt to changes in wire feed speed and the like in a similar fashion.

System 100 automatically adjusts height H and/or at least one of the arc current level, the voltage level, or the wire feed speed for a welding operation based on a change in a welding parameter, wherein the welding parameter impacts at least one of the arc current level, the voltage level, or the wire feed speed. In other words, when a parameter of the welding operation is changed (e.g., increased or decreased) from one value to another value and that change directly results in a change to at least one of the arc current level, the voltage, or the wire feed speed, system 100 provides adjustment to at least one of height H, arc current level, voltage, and/or wire feed speed without user intervention or action. Generally, the welding parameter can be, but is not limited to, a welding parameter that affects at least one of arc current level for the welding operation, voltage for the welding operation, or wire feed speed for the welding operation. Other parameters include a temperature of welding wire, a temperature of electrode, a type of material of workpiece W, a frequency of oscillation of electrode 32, a polarity of the arc current, a polarity of the current for welding wire, a parameter that affects an arc current of the welding operation, and the like.

According to an embodiment, controller 130 includes a detector, generally indicated at 150, that senses the orientation of the welder 101 and, in particular, the orientation of the torch 30. Detector may include any number of position sensors suitable for detecting the orientation of the torch 30 including but not limited to a position sensitive switch, accelerometer, and the like. In the example shown, detector 150 senses when the welder 101 is in an inverted position such as the 1G position described herein.

Figure 5:
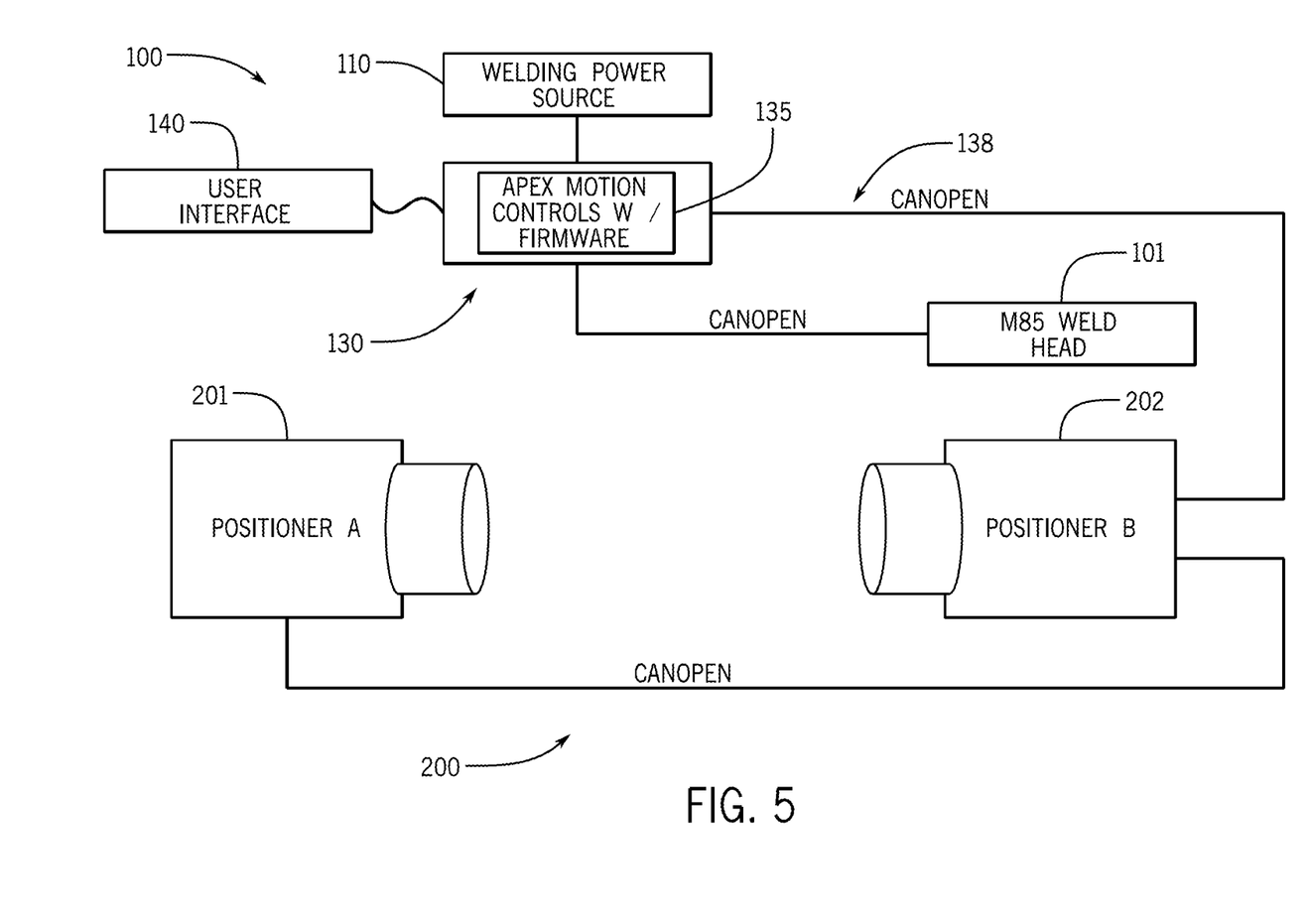
FIG. 5 is a block diagram of a welding system according to an embodiment.
Figure 6:
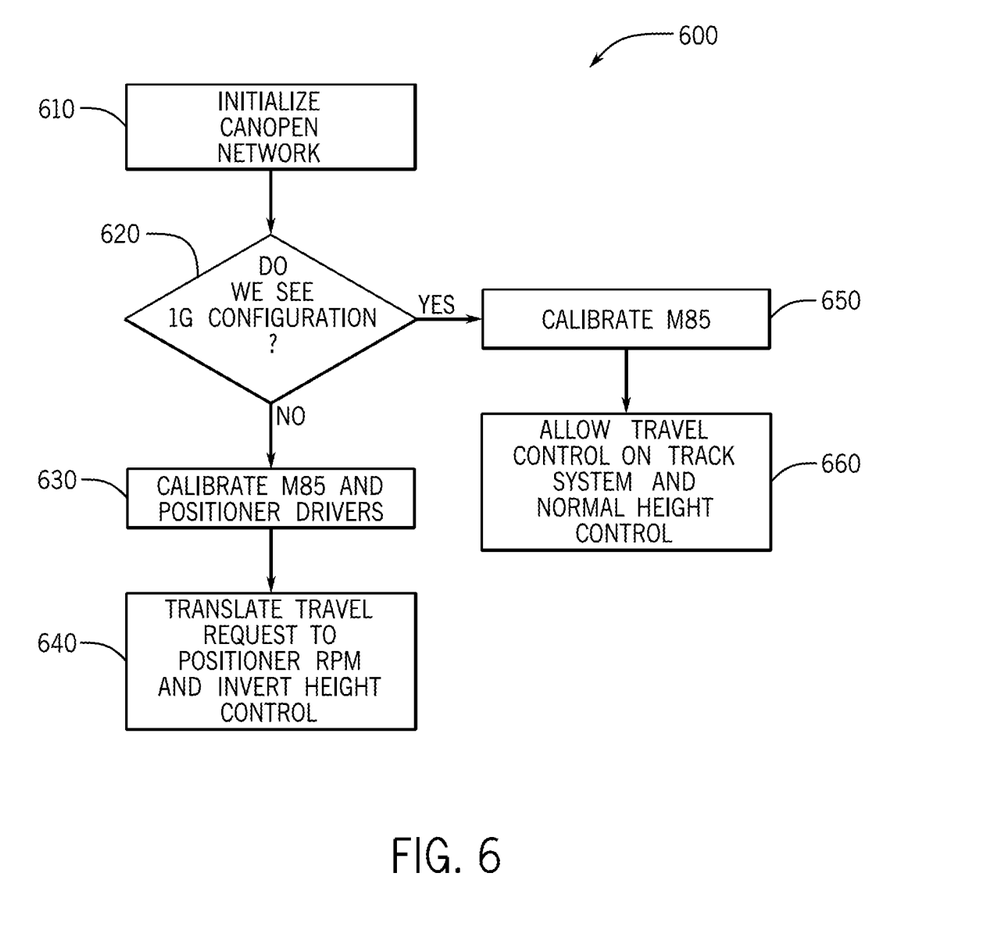
FIG. 6 is a flow diagram of configuring a welding system for operation in a fixed inverted orientation.

Upon detection, welder 101 normal travel is converted to an index travel to allow the setting of top dead center in reference to pipe sections P1, P2 for torch 30 location. One example of the steps taken by the system 100 to adapt to the 1G position is provided in FIGS. 5 and 6. With reference to FIG. 5, welding system 100 includes a weld head or welder 101 and a power source 110 that supplies electrical current to the welder 101. As shown, a controller 130 connects welder 101 to power source 110 and may be used to control the application of electrical power to welder 101. Controller 130 may optionally include a user interface 140 as described more completely below. A positioner assembly 200 is also connected to controller 130 and is used to move the workpiece relative to welder 101. Positioner assembly 200 may include a one or more positioners as required by the size of the workpiece or number of workpiece sections. Also as discussed below, multiple positioners may be provided to create multiple weld stations in which the welder 101 may operate independently. In the example shown, positioner assembly 200 includes a first positioner 201 and a second positioner 202 that are both connected to controller 130. Controller 130 may be any suitable controller including but not limited to a digital controller, computer or the like. Controller 130 includes a motion control unit 135 that communicates with the welder 101, first positioner 201, and second positioner 202 in the depicted example. Once the system is powered on, controller 130 detects if positioners are available (FIG. 6). If positioners are available, a calibration of the positioners 201, 202 and welder 101 is performed by controller 130. Calibration establishes physical limits and requirements for speed, current consumption, communications protocols and inputs are set. After successful calibration, travel controls that would normally move the orbital welder around the track are translated into a revolutions per minute value for the positioner assembly 200 to rotate the workpiece relative to welder 101. Also, as mentioned, height controls are inverted by controller 130 such that any adjustment becomes an up adjustment allowing automatic adjustment of height and current as discussed and similarly allowing any manual height adjustment to be performed by the user without the risk of driving the electrode into the weld.

With reference to FIG. 6, one exemplary operation 600 of welding system 100 is shown. Operation of the system is implemented through the system components described above and coordinated by controller 130. Upon starting the system 100, the network 138 (FIG. 5) connecting the components of the system 100 is initialized and the various connected components are detected by controller 130 at 610. If, at 620, the controller 130 via detector 150 detects a 1G configuration of welder 101, the welder 101 is calibrated at 630 and height controls are inverted at 640. If a positioner assembly is also detected with the 1G configuration, the positioner drivers are calibrated at 630 and the travel request for orbital welder movement is converted into a revolutions per minute value for the positioners at 640. The operator requested welding travel speed that is normally driven to the internal weld head travel control is now converted based on the size of the pipe and gearing of the positioners to pipe surface travel speed. Thus when an operator specifies that the welding travel speed is 20 rpm the actual pipe is rotated so that the surface is moving under the weld head at 20 rpm.

If a 1G configuration is not detected at 620, the welder 101 is calibrated for orbital operation at 650 and travel control and height control operate under normal settings at 660 allowing the orbital welder to travel along a track.

With reference to FIG. 4, multi-axis support may be added and multiple positioners may be provided to increase the operational efficiency of the weld system 100. Each positioner may be used as a separate welding station WS allowing a first workpiece W1 to be welded on a first positioner 201 while a second workpiece W2 is staged or loaded on a second positioner 202. Additional positioners or stations may be added as needed. In the example shown, positioners are connected to controller 130 via a digital link. Alternatively, to accommodate older positioners, controller 130 may include an input/output detector to automatically detect non-digital devices and send analog or other appropriate control signals for the detected positioner.

According to another embodiment, when one or more positioners are not being used in a weld operation, system automatically allows the positioner to go to a jog state. In this state, the positioner that is not under a weld operation may be manually jogged.

Controller 130 may optionally be connected to or include a user interface 300. User interface 300 may be integral with controller or a remote interface may be provided. With reference to FIG. 2, a user interface is schematically shown and connects to controller 130 via a wired 301 and/or wireless 302 connection. User interface 300 may include a display 310. Display 310 is any device that conveys information from controller 130 to user and may include a visual, audible, or tactile device. Non-limiting examples of visual displays include indicator lights or LEDs, a display screen, or digital readout. Non-limiting examples of audible displays include a speaker, tone generator, or chime. Tactile devices may include vibratory devices or braille readers. Likewise, user interface 300 may include an input 320 that allows the user to communicate commands to the controller 130 for example to modify parameters of the welding system or indicate operating conditions. Suitable inputs may include voice recognition devices, keypads, touch screens, knobs, sliders or other manually manipulated devices. Touch screens may be used to combine input and display capability of the user interface 300.

Figure 7:
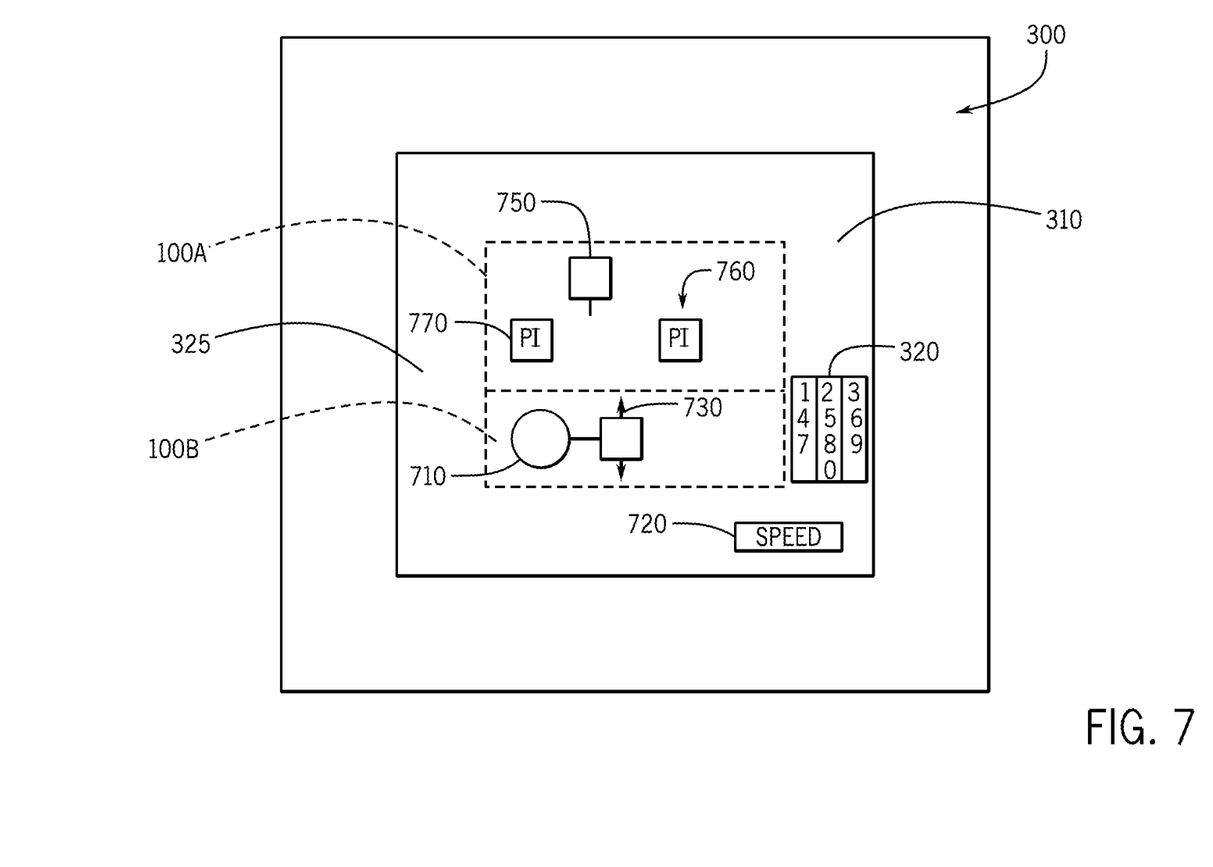
FIG. 7 is a partially schematic view of a user interface according to an embodiment.

According to an embodiment schematically depicted in FIG. 7, controller 130 adapts user interface 300 to provide system flexibility and improve the user experience through better control and communication of the system configuration. For example, controller 130 may adapt display 310 to reflect the detected system configuration, orientation of the welder 101 (1G 1OOA, orbital 1008) and or other components provided within or connected to system 100. In one example, when welding system 100 is in an orbital configuration (1008), the track setup 710 may be presented to the user on a display 310 and a user input 320 may be provided to allow the user to configure track related parameters such as travel speed 720 or direction 730. In the example shown, display and input are combined on a touch pad 325. In a 1G configuration (1OOA), the orientation of the welder 101 may be schematically indicated at 750 along with the presence of any positioners or other connected components at 760. When positioners are detected, the display may provide positioner options at 770. For example, display 310 may include indicators and inputs (P1) that allow the user to select an active positioner in a multi-positioner system, configure the positioner based on workpiece size, such as a pipe diameter, and alter other positioner options.

In accordance with an embodiment welding system includes a welder that may be configured to perform orbital welding operations where the welder moves on a track and fixed welding operations where the workpiece is moved relative to the welder. According to another embodiment, the welder is inverted to achieve a 1G configuration relative to the workpiece.

According to a further embodiment, the welding system includes a power supply; a controller in communication with the power supply; a welder in communication with the controller; wherein the controller detects a configuration of the welder, wherein the configuration of the welder includes at least a 1G configuration; and wherein upon the controller detecting the 1G configuration, the controller inverts a height adjustment and automatically calculates a contact tip to work distance.

According to a further embodiment, the welding system includes a positioner connected to the controller, where the controller upon detecting the 1G configuration converts a travel position of the welder into a motion of the positioner. According to still a further embodiment, the positioner includes a chuck mounted on a drive shaft of a motor, and where the motion of the positioner set by the controller is a revolutions per minute value. According to yet another embodiment, the controller coordinates movement of the positioner with operation of the welder in the 1G position.

According to a further embodiment, the welding system includes a user interface connected to the controller, wherein the user interface includes a display conveying at least the configuration of the welder. According to still a further embodiment, the user interface includes a user input. In yet another embodiment, the user input allows the user to set welder parameters including at least one of a travel speed and a workpiece diameter. According to another embodiment, a welding system for welding a workpiece includes a power supply; a controller in communication with the power supply; a positioner assembly in communication with the controller, the positioner assembly including at least a first positioner, the first positioner including a chuck, the chuck being mounted on a drive shaft and driven by a drive motor to rotate the chuck; a welder in communication with the controller; a support that holds the welder in an inverted configuration; wherein the controller detects the inverted configuration of the welder, and wherein upon the controller detecting the inverted configuration, the controller inverts a height adjustment and automatically calculates a contact tip to work distance.

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those skilled in the art.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof

What is claimed is:

1. A welding system comprising:
   a power supply;
   a controller in communication with the power supply;
   a welder in communication with the controller, wherein the welder is configurable to an angular configuration and a fixed configuration, wherein the fixed configuration comprises a 1G configuration;
   wherein the controller is configured to:
      detect a configuration of the welder,
      upon detection of the fixed configuration, invert a height adjustment and automatically calculate a contact tip to work distance, wherein the contact tip to work distance comprises a distance between a contact tip of the welder and a workpiece; and
      adjust at least one of the contact tip to work distance or an arc current level based on the inverted height adjustment.

2. The welding system of claim 1, further comprising a positioner connectable to the controller, wherein the controller is configured to convert a travel position of the welder into a motion of the positioner upon detection of the fixed configuration.

3. The welding system of claim 2, wherein the positioner comprises a chuck mounted on a drive shaft of a motor, and wherein the motion of the positioner set by the controller is a revolutions per minute value.

4. The welding system of claim 2, wherein the controller is configured to coordinate movement of the positioner with operation of the welder in the fixed configuration.

5. The welding system of claim 2, wherein the positioner is configured to move a workpiece relative to the welder.

6. The welding system of claim 5, wherein the positioner is further configured to rotate the workpiece relative to the welder.

7. The welding system of claim 1, further comprising a user interface connected to the controller, wherein the user interface includes a display configured to convey at least the configuration of the welder.

8. The welding system of claim 7, wherein the user interface further comprises a user input.

9. The welding system of claim 8, wherein the user input allows the user to set welder parameters including at least one of a travel speed and a workpiece diameter.

10. The welding system of claim 1, further comprising a positioner assembly including a first positioner and a second positioner, wherein the first positioner is configured to define a first workstation and the second positioner is configured to define a second workstation.

11. The welding system of claim 1, wherein the controller is further configured to detect if the welder is in an inverted configuration.

12. The welding system of claim 11, wherein the controller is further configured to:
    invert the height adjustment if the controller detects that the welder is in the inverted configuration; and
    calibrate the welder for orbital operation if the controller does not detect that the welder is in the inverted configuration.

13. A welding system for welding a workpiece comprising:
    a power supply;
    a controller in communication with the power supply;
    a positioner assembly in communication with the controller, the positioner assembly including at least a first positioner, the first positioner including a chuck, the chuck being mounted on a drive shaft and driven by a drive motor to rotate the chuck;
    a welder in communication with the controller; and
    a support configured to hold the welder in an inverted configuration; wherein the controller is configured to:
       detect the inverted configuration of the welder;
       upon detection of the inverted configuration, invert a height adjustment and automatically calculate a contact tip to work distance, wherein the contact tip to work distance comprises a distance between a contact tip of the welder and a workpiece; and
       adjust at least one of the contact tip to work distance or an arc current level based on the inverted height adjustment.

14. The welding system of claim 13, further comprising a user interface connected to the controller.

15. The welding system of claim 14, wherein the support is moveable in a vertical direction to set a height of the welder relative to the chuck.

16. A method comprising:
    detecting, by a controller, an inverted configuration of a welder;
    inverting, by the controller, a height adjustment control of the welder and automatically calculating a contact tip to work distance, in response to detection of a first configuration, wherein the contact tip to work distance comprises a distance between a contact tip of the welder and a workpiece; and adjusting at least one of the contact tip to work distance or an arc current level based on the inverted height adjustment.

17. The method of claim 16, further comprising automatically calculating a contact tip to work distance in response to the detection of the first configuration.

18. The method of claim 16, wherein the first configuration comprises a fixed, inverted configuration.

19. The method of claim 16, further comprising, upon detection of a second configuration, calibrating the welder for orbital operation, wherein the second configuration comprises a non-inverted configuration.

* * * * *